(12) United States Patent
Ciuca et al.

(10) Patent No.: US 9,652,401 B2
(45) Date of Patent: May 16, 2017

(54) TAGGED CACHE FOR DATA COHERENCY IN MULTI-DOMAIN DEBUG OPERATIONS

(71) Applicant: Freescale Semiconductor, Inc., Austin, TX (US)

(72) Inventors: Dorin Florian Ciuca, Chitila (RO); Teodor Madan, Bucharest (RO); Adrian-George Stan, Bucharest (RO)

(73) Assignee: NXP USA, Inc., Austin, TX (US)

( * ) Notice: Subject to any disclaimer, the term of this patent is extended or adjusted under 35 U.S.C. 154(b) by 21 days.

(21) Appl. No.: 14/921,244

(22) Filed: Oct. 23, 2015

(65) Prior Publication Data

US 2017/0046271 A1    Feb. 16, 2017

(30) Foreign Application Priority Data

Aug. 13, 2015    (RO) .............................. A2015-00596

(51) Int. Cl.
*G06F 12/08*    (2016.01)
*G06F 12/1009*    (2016.01)
*G06F 12/0864*    (2016.01)

(52) U.S. Cl.
CPC ...... *G06F 12/1009* (2013.01); *G06F 12/0864* (2013.01); *G06F 2212/60* (2013.01); *G06F 2212/65* (2013.01)

(58) Field of Classification Search
CPC ............. G06F 12/0846; G06F 12/0806; G06F 12/084; G06F 12/0842; G06F 12/0855; G06F 12/0857; G06F 12/1009; G06F 12/1045; G06F 12/1063; G06F 12/109; G06F 2212/60; G06F 2212/65
See application file for complete search history.

(56) References Cited

U.S. PATENT DOCUMENTS 5,230,045 A * 7/1993 Sindhu ................ G06F 12/1036
711/203
6,360,314 B1 * 3/2002 Webb, Jr. .............. G06F 9/3826
712/206
6,925,634 B2   8/2005 Hunter et al.
(Continued)

OTHER PUBLICATIONS

Sourceware.org, "Debugging With GDB", 1 pg. (May 2015).
(Continued)

*Primary Examiner* — Hiep Nguyen

(57) ABSTRACT

A tagged cache is disclosed for data coherency in multi-domain debug operations. Access requests to a memory within a target device are received for data views associated with debug operations, and access requests include virtual addresses associated with virtual address spaces and client identifiers associated with requesting data views. Virtual addresses are translated to physical addresses within a tagged cache using address translation tables that associate virtual addresses from the different virtual address spaces with client identifiers and with physical addresses within the cache. Data within the cache is cached using the physical addresses. Further, when data is written to the cache, virtual address tags within the cache are used to identify if other virtual addresses are associated with the physical address for the write access request. If so, client identifiers stored within the address translation tables are used to notify affected data views of changed data.

20 Claims, 5 Drawing Sheets

(56) References Cited

U.S. PATENT DOCUMENTS

| | | | |
|---|---|---|---|
| 7,334,108 B1* | 2/2008 | Case | G06F 12/1045 710/26 |
| 7,552,254 B1* | 6/2009 | George | G06F 9/34 710/52 |
| 8,200,908 B2 | 6/2012 | Moyer | |
| 8,572,323 B2 | 10/2013 | Ehrlich et al. | |
| 2005/0091439 A1* | 4/2005 | Mohideen | G06F 12/109 711/1 |
| 2008/0034355 A1* | 2/2008 | Shen | G06F 8/443 717/148 |
| 2009/0031289 A1 | 1/2009 | Michael | |
| 2009/0307430 A1* | 12/2009 | Bruening | G06F 12/0862 711/119 |
| 2014/0123146 A1* | 5/2014 | Barrow-Williams | G06F 9/5033 718/102 |
| 2014/0223141 A1* | 8/2014 | Combs | G06F 12/1036 712/207 |

OTHER PUBLICATIONS

Sourceware.org, "10.21 Caching Data of Targets", 2 pgs. (May 2015).
Freescale, "CodeWarrior Development Studio for Microcontrollers V10.X Getting Started Guide", 70 pgs. (Jan. 2011).

* cited by examiner

TAGGED CACHE FOR DATA COHERENCY IN MULTI-DOMAIN DEBUG OPERATIONS

RELATED APPLICATIONS

This application claims priority under 35 USC §119 to Romanian Patent Application No. A201500596 filed on Aug. 13, 2015, and entitled "TAGGED CACHE FOR DATA COHERENCY IN MULTI-DOMAIN DEBUG OPERATIONS," which application is hereby incorporated by reference in its entirety.

TECHNICAL FIELD

This technical field relates to debug operations with respect to a target device and, more particularly, to debug operations including multiple data domains.

BACKGROUND

For application development with respect to integrated circuit (IC) systems including microcontroller systems, debug management devices or debuggers are used to debug programmable logic used within the IC systems. Such programmable logic can be implemented, for example, using one or more processors or processing cores that execute instructions, such as software or firmware instructions, to perform the application functions of the IC system. In part, a debugger often operates to display data associated with the operations of the programmable logic within the IC system. As such, the debugger allows for a system designer to identify and correct errors within the programmable logic. Many debuggers allow multiple data views and related data domains, and these multiple data domains can overlap with respect to data within memory for the target IC system. Data coherency becomes difficult for these multiple data domains as each debug data view allows independent data changes. To address data changes, traditional debuggers use a different cache for each different data view and related data domain. However, where data domains overlap with respect to physical memory, it is typically required to flush and repopulate these different caches in order to make sure that associated data views do not present stale values.

DESCRIPTION OF THE DRAWINGS

It is noted that the appended figures illustrate only example embodiments and are, therefore, not to be considered as limiting the scope of the present invention. Elements in the figures are illustrated for simplicity and clarity and have not necessarily been drawn to scale.

DETAILED DESCRIPTION

A tagged cache is disclosed for data coherency in multi-domain debug operations. Access requests to a memory within a target device are received for a plurality of data views associated with debug operations, and the memory access requests include virtual addresses associated with different virtual address spaces and client identifiers associated with requesting data views. The virtual addresses are then translated to physical addresses within a tagged cache using address translation tables. The address translation tables associate virtual addresses from the different virtual address spaces with physical addresses within the cache and with client identifiers for data views for the virtual addresses. Data within the cache is cached using the physical addresses. Further, when an access request is a write access request, data is written to the cache, virtual address tags within the cache are used to identify if other virtual addresses are associated with the physical address for the write access request. If so, client identifiers stored within the address translation tables are used to notify data views associated with the other virtual addresses of changed data, and the notified data views can update their respect data with the changed data. In addition, when new virtual addresses are used within access requests, translation information is added to the address translation tables to associate the virtual addresses with physical addresses within the cache and with client identifiers. Further, the cache is also tagged with the virtual addresses as well. A variety of additional or different features and variations can also be implemented.

In operation, the disclosed tagged cache embodiments allow cached data to be re-used among virtual address spaces associated with data views for debug operations, and data change notifications can be provided based upon the memory translation information that associates virtual addresses within virtual address spaces with physical addresses within the cache. By using a common tagged cache for different data views and related virtual address spaces, data and cache coherency are maintained over potentially overlapping address spaces for the data views. As such, different data views with potentially overlapping data domains are able to provide coherent display of data to the same physical memory spaces. Further, using the address translation tables that associate virtual addresses with physical addresses and client identifiers for the data views, affected data views can be notified of data changes to physical address spaces without needing to translate all addresses associated with the physical memory space. As such, the disclosed embodiments provide cache coherency and efficient data change notifications for multi-domain debug processing.

Figure 1:
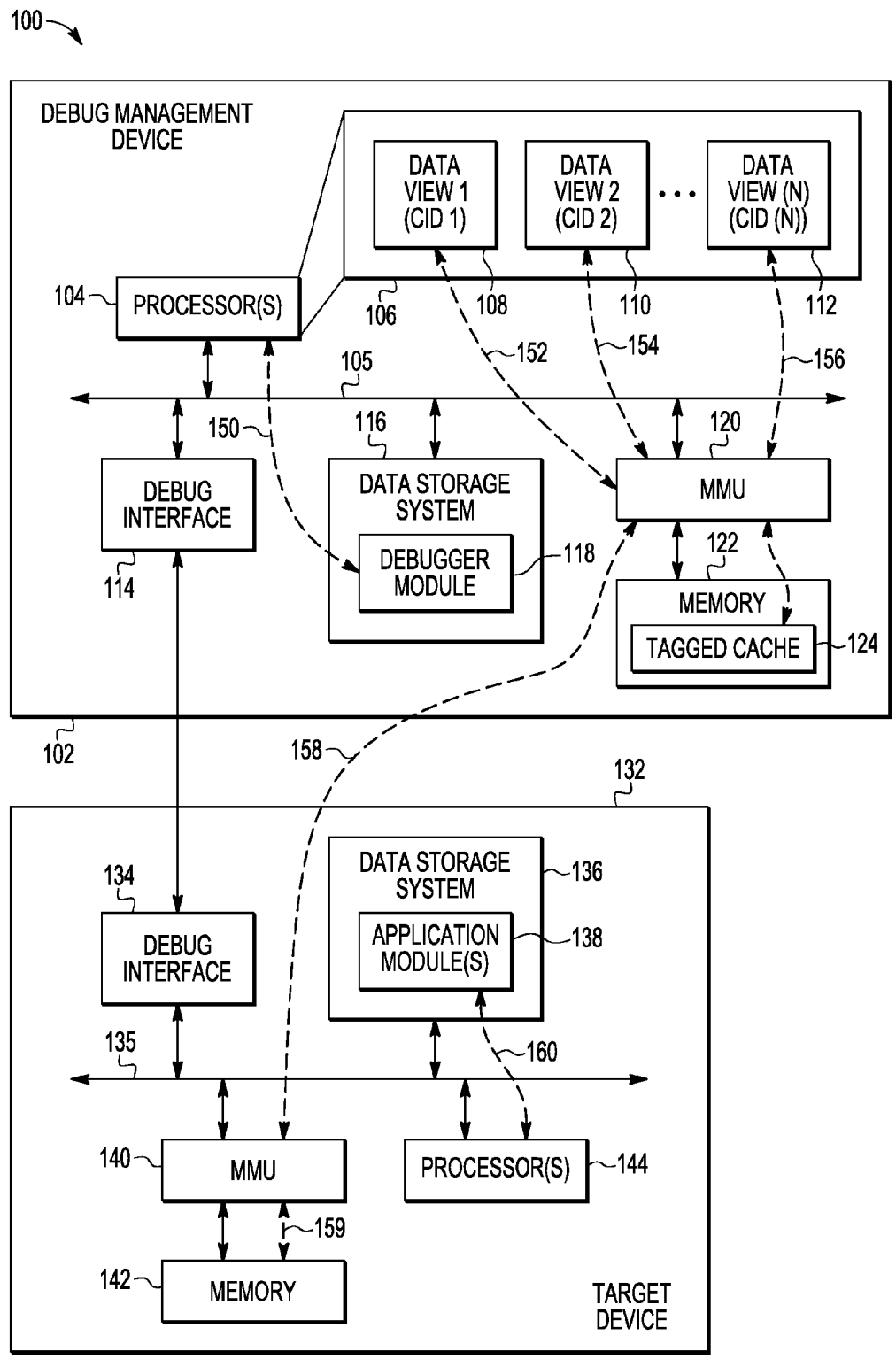
FIG. 1 is a block diagram of an example embodiment for a debug environment including a debug management device that uses a tagged cache to provide data coherency among multiple data views with respect to memory on a target device.

FIG. 1 is a block diagram of an example embodiment for a debug environment 100 including a debug management device 102 that uses a tagged cache 124 to provide data coherency among multiple data views 106 with respect to memory 142 on a target device 132. The debug management device 102 includes data storage system 116, a memory management unit (MMU) 120, a debug interface 114, and one or more processors 104 coupled to each other a system bus interconnect 105. The MMU 120 is coupled to a memory 122 that includes the tagged cache 124, and the MMU 120 controls data stored within the tagged cache 124. The target device 132 includes data storage system 136, a memory management unit (MMU) 140, a debug interface 134, and one or more processors 144 coupled to each other through a system bus interconnect 135. The MMU 140 is coupled to a memory 142 and controls data stored within the memory 142. It is noted that each of the one or more processors 104 and 144 can further include one or more processing cores.

The data storage system 116 stores a debugger module 118 that is executed by the one or more processors 104 as indicated by dashed arrow 150. For example, the debugger module 118 can be implemented as instructions that when executed by the one or more processors 104 cause the debug functions described herein to be performed by the debug management device 102. As described herein, the debugger module 118 can be used to form multiple data views 106 for data associated with applications operating on the target device 132, and each of the data views 106 effectively operates as a memory access client and can be associated with a different client identifier (CID). As such, a first data view 108 can be associated with a first client identifier (CID1); a second data view 110 can be associated with a second client identifier (CID2); and so on, with an Nth data view 112 being associated with an Nth client identifier (CID(N)). As described in more detail below, the MMU 120 and the tagged cache 124 are used to control accesses by the data views 106 to data within the tagged cache 124 and ultimately to data within the memory 142 for the target device 132.

The data storage system 136 stores one or more application module(s) 138 that are executed by the one or more processors 144 as indicated by dashed arrow 160. For example, the one or more application module(s) 138 can be implemented as instructions that when executed by the one or more processors 144 cause the target device 132 to perform a desired function. The target device can be implemented, for example, as an integrated circuit (IC) system that executes the application modules 138 to perform any of a variety of functions. As one example for an IC system, the processors 144 can be a microcontroller system that executes one or more application modules 138 to implement functions relating to automotive products, such as automotive control, audio, navigation, and/or other functions.

In operation, the debug management device 102 and the debugger module 118 are used to monitor, test, and correct the application modules 138 to improve the operations of the target device 132. The different data views 106 display operational data as it is used and modified by the execution of the applications modules 138 within the target device 132. Rather than provide direct communications from the data views 106 to the MMU 140 and thereby to the data within memory 142 for the target device 132 as done in prior solutions, the MMU 120 and tagged cache 124 provide an intervening layer of cached data between the data views 106 and the data within memory 142. In particular, as indicated by dashed arrows 152, 154 . . . 156 from individual data views 108, 110 . . . 112, the MMU 120 receives access requests from the data views 106 and communicates with MMU 140 to implement requested read or write access operations to memory 142, as indicated by dashed arrows 158 and 159. The MMU 120 also tracks translations between virtual address spaces used by the different data views 106 and the physical addresses within the tagged cache 124. As such, the MMU 120 is able to maintain data coherency for the data views 106 using the tagged cache 124, and the MMU 120 can also provide notifications of data changes to the individual data views 108, 110 . . . 112 when data within one data view is changed by another data view.

Figures 2, 3:
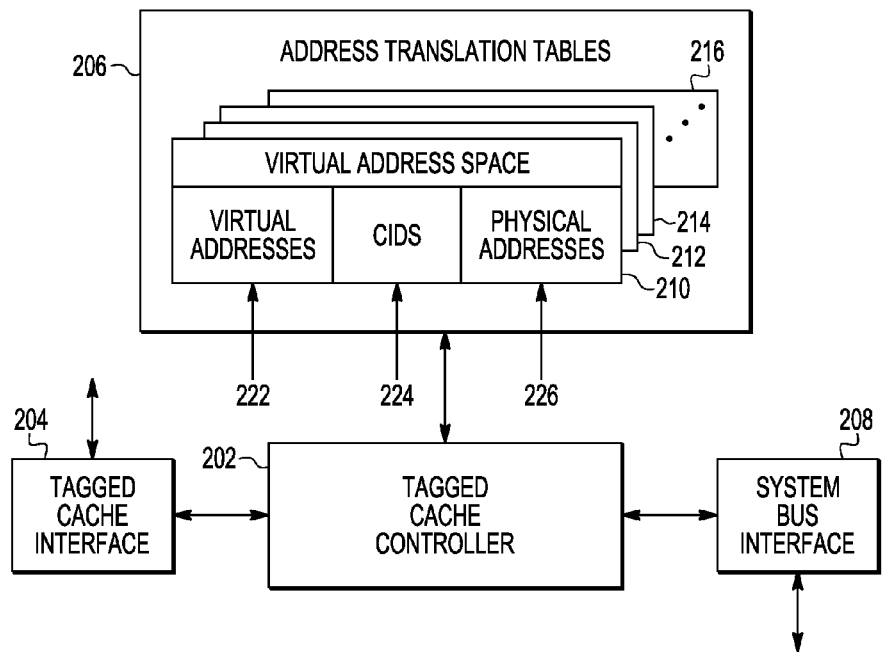
FIG. 2 is a block diagram of an example embodiment for the memory management unit in FIG. 1.
FIG. 3 is a block diagram of an embodiment for the tagged cache in FIG. 1.

FIG. 2 is a block diagram of an example embodiment for MMU 120. A system bus interface 208 is coupled to the system bus 105 and receives memory access requests from the data views 106. The access requests in part include virtual addresses for the data to be accessed as well as the client identifier (CID) for the data view making the request. The cache controller 202 receives these memory access requests and uses address translation tables 206 to translate the virtual memory addresses to physical memory addresses within the tagged cache 124. The cache controller 202 also tags the data within the tagged cache 124 using the virtual memory addresses and the tagged cache interface 204 which is coupled to the tagged cache 124. The address translation tables 206 include one or more tables 210, 212, 214 . . . 216 that store translation information for different virtual address spaces. Each of the tables 210, 212, 214 . . . 216 include virtual address spaces defined by one or more data records that associate virtual addresses 222 with client identifiers (CIDs) 224 and physical addresses 226 within the tagged cache 124.

FIG. 3 is a block diagram of an example embodiment for tagged cache 124. The tagged cache 124 includes a number of different physical addresses (PHY1, PHY2, PHY3 . . . PHY(x)) 304 and associated physical address spaces that store data (DATA1, DATA2, DATA3 . . . DATA(x)) 306. The physical addresses 304 correspond to the physical addresses 226 within the address translation tables 206, and the physical addresses 304 are also tagged with virtual address tags (TAGS1, TAGS2, TAGS3 . . . TAGS(x)) 302 that identify which virtual addresses received by the MMU 120 have addressed the data within the particular physical address space.

Figure 4:
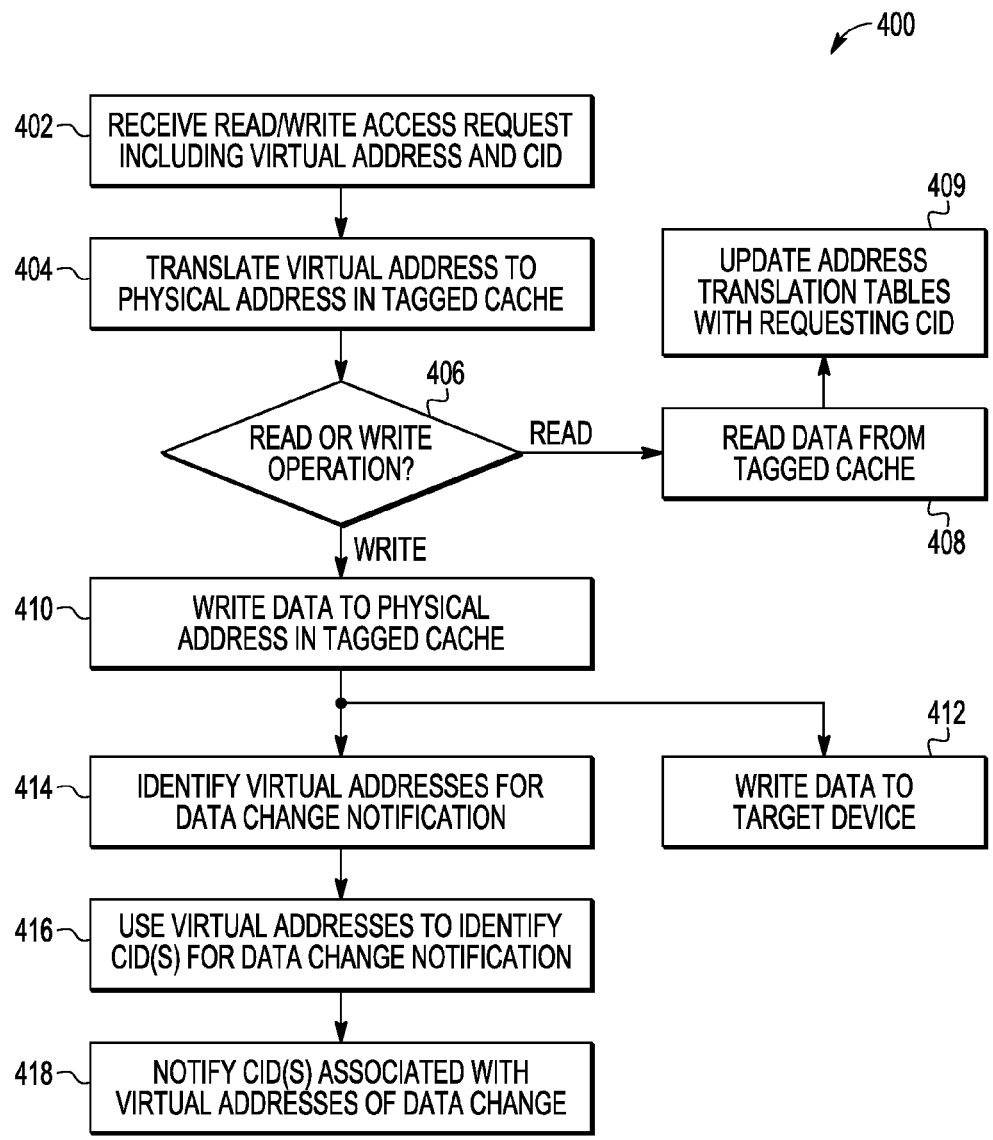
FIG. 4 is a process flow diagram of an embodiment for operation of the cache controller to process an access request associated with one of the data views.

FIG. 4 is a process flow diagram of an embodiment 400 for operation of the cache controller 202 to process an access request associated with one of the data views 106. In block 402, the cache controller 202 receives a read/write access request that includes a virtual address for the access request along with the CID for the requesting data view. In block 404, the cache controller 202 translates the virtual address to a physical address in the tagged cache 124 using the address translation tables 206. In block 406, a determination is made whether the operation is a read operation or a write operation. If a "READ" operation, the flow passes to block 408 where the cache controller 202 reads data from the tagged cache 124 using the physical address. This data can then be provided back to the requesting data view. Flow then passes to block 409 where CID data associated with the requested virtual address space from address translation tables 206 (e.g., CIDs 224 within table 210) is updated with the CID for the requesting data view. The updated list of CIDs can then be used for subsequent data change notifications in block 418, as described below. If a "WRITE" operation, then flow passes to block 410 where the cache controller 202 writes data associated with the write access request to the physical address within the tagged cache 124. Flow then passes to blocks 412 and 414. In block 412, the data associated with the write access request is written from the debug management device 102 to the target device 132. In block 414, the cache controller 202 identifies additional virtual addresses, if any, within the tags 302 for the physical address associated with the write access in preparation for a subsequent data change notification. In block 416, the cache controller 202 uses these identified virtual addresses to further identify any CIDs associated with these identified virtual addresses. In block 418, the cache controller 202 notifies the data views associated with the CID(s), if any, of the data change. The affected data views can then be updated with the changed data so that data display coherency is maintained.

Figure 5:
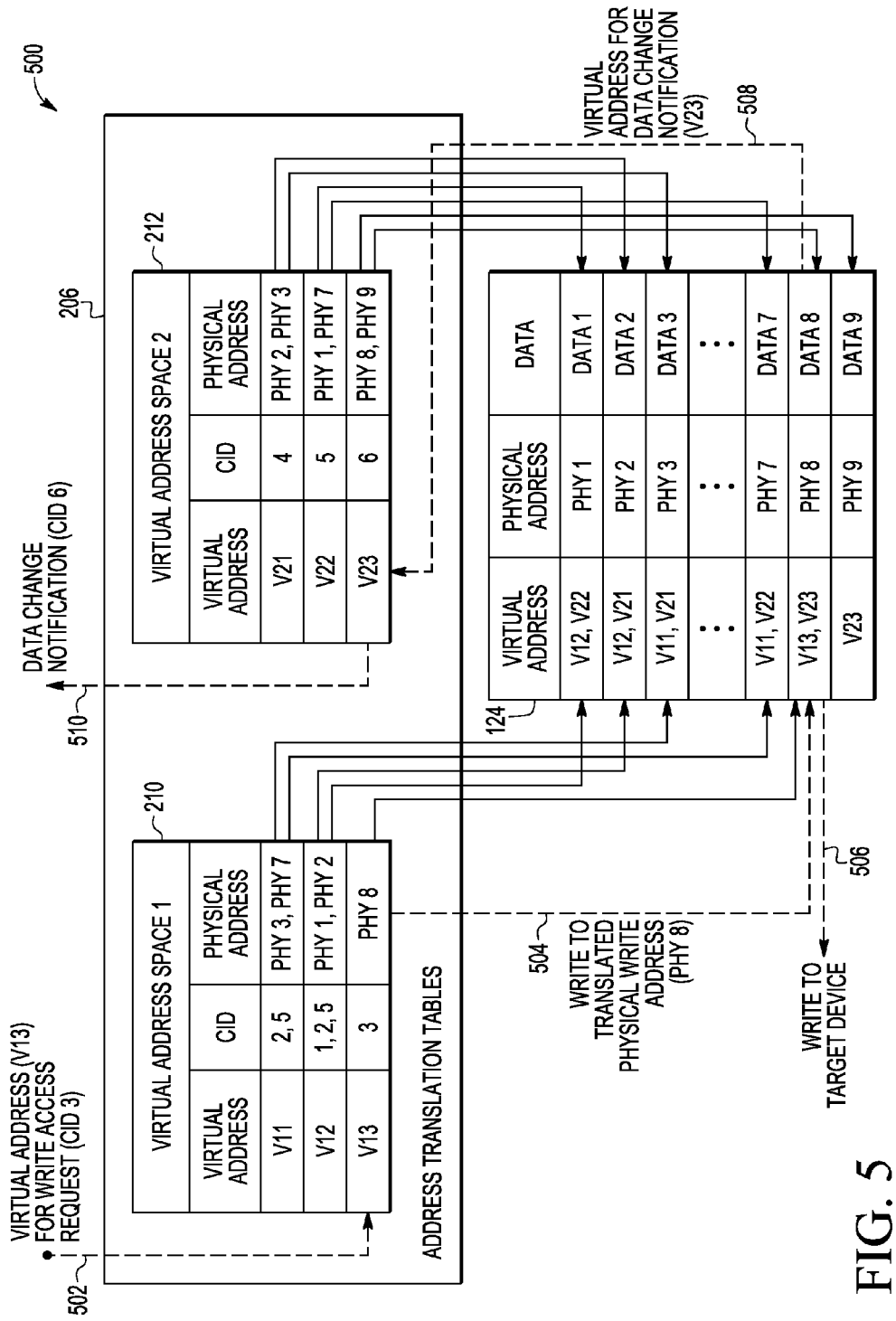
FIG. 5 is a block diagram of an embodiment for the tagged cache and address translation tables where an example data write access is initiated through a data view.

FIG. 5 is a block diagram of an embodiment 500 for tagged cache 124 and address translation tables 206 where an example data write access is initiated through a data view associated with CID3. For the example embodiment 500, it is assumed that two address translation tables 210 and 212 and related virtual address spaces are being used by six different data views associated with six different CIDs and associated with a variety of different physical addresses (PHYs) within the tagged cache 124. The first address space 210 includes three different virtual addresses (V11, V12, V13). The first virtual address (V11) is associated with CID2 and CID5 as well as physical addresses PHY3 and PHY7. The second virtual address (V12) is associated with CID1, CID2, and CID5 as well as physical addresses PHY1 and PHY2. And the third virtual address (V13) is associated with CID3 as well as physical address PHY8. The second address space 212 also includes three different virtual addresses (V21, V22, V23). The first virtual address (V21) is associated with CID4 as well as physical addresses PHY2 and PHY3. The second virtual address (V22) is associated with CID5 as well as physical addresses PHY1 and PHY7. And the third virtual address (V23) is associated with CID6 as well as physical addresses PHY8 and PHY9. The arrows between virtual address spaces 210/212 and physical address space for the tagged cache 124 show the translation relationship from the virtual addresses to the physical addresses.

For the embodiment 500, the tagged cache 124 includes nine physical addresses within the physical address space for physical memory segments being used within the tagged cache 124. First data (DATA1) is stored at the first physical address (PHY1), and PHY1 is tagged with virtual addresses V12 and V22. Second data (DATA2) is stored at the second physical address (PHY2), and PHY2 is tagged with virtual addresses V12 and V21. Third data (DATA3) is stored at the third physical address (PHY3), and PHY3 is tagged with virtual addresses V11 and V21. Seventh data (DATA7) is stored at the seventh physical address (PHY7), and PHY7 is tagged with virtual addresses V11 and V22. Eighth data (DATA8) is stored at the eighth physical address (PHY8), and PHY8 is tagged with virtual addresses V13 and V23. Ninth data (DATA9) is stored at the ninth physical address (PHY9), and PHY9 is tagged with virtual address V23. Data and virtual address tags can also be stored for the fourth through sixth physical addresses, although not shown.

For the embodiment 500, it is assumed that a write access request has been received from CID3 including a virtual address (V13) within the translation table 210 for the first address space. As indicated by dashed arrow 502, the virtual address V13 is translated to the associated physical address (PHY8) within the translation table 210. As indicated by dashed arrow 504, the data associated with the write access request is written to PHY8 within the physical address space for the tagged cache 124 and replaces existing data (DATA8). The virtual address tags for this physical address (PHY8), which include V13 and V23, are used to identify additional virtual addresses that are effected by the change to the data (DATA8) within PHY8. As represented by dashed arrow 508, V23 is identified as an additional virtual address that is affected by the data charge and for which data change notification is to be made, and V23 is used to identify any CIDs associated with virtual address V23. As represented by dashed arrow 510, a data change notification is sent to the data view associated with CID6 as CID6 is associated with virtual address V23 within the second translation table 212. This data view can then update its data based upon the changed data.

Figure 6:
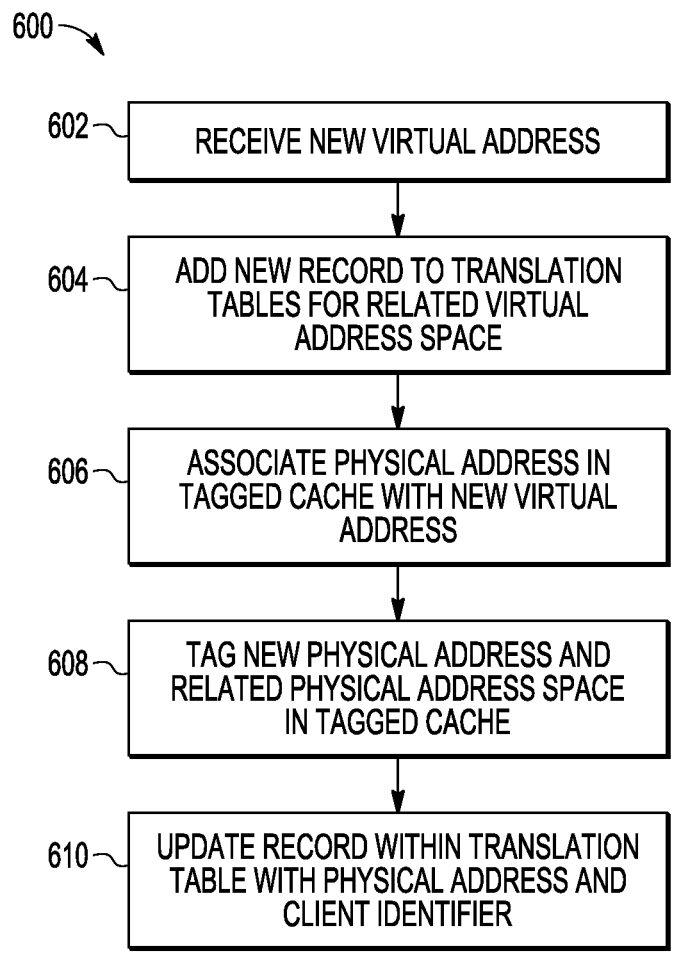
FIG. 6 is a process flow diagram of an embodiment for operation of the cache controller to generate address translation table entries and tagged cache data when an access request from a data view includes a new virtual address not within the address translation tables.

FIG. 6 is a process flow diagram of an embodiment 600 for operation of the cache controller 202 to generate address translation table entries and tagged cache data when an access request from a data view includes a new virtual address not within the address translation tables. In block 602, the new virtual address is received. In block 604, a new record is added to the translation tables 206 with respect to the related virtual address space. In block 606, a determination is made whether this new virtual address refers to a new physical address within the tagged cache 124. In block 606, a physical address within the address space for the tagged cache 124 is associated with the new virtual address. In block 608, a new physical address and related physical address space within is tagged with the virtual address within the tagged cache 124. In block 610, the new record within the translation table is updated with the client identifier (CID) associated with the access request and with the physical address associated with the virtual address.

As described herein, a variety of embodiments can be implemented and different features and variations can be implemented, as desired.

For one embodiment, a method to manage debug operations is disclosed including receiving access requests to a memory within a target device for a plurality of data views associated with debug operations, the memory access requests including virtual addresses associated with different virtual address spaces and client identifiers associated with requesting data views; translating the virtual addresses to physical addresses within a cache using address translation tables, the address translation tables associating virtual addresses from the different virtual address spaces with client identifiers and with physical addresses within the cache; and accessing data within the cache using the physical addresses; wherein data within the cache is tagged with virtual addresses from prior access requests that accessed the data.

In another embodiment, the method further includes, when an access request is a write access request, writing data associated with the write access request to the cache at a physical address associated with a virtual address within the write access request. In an additional embodiment, the method includes using virtual address tags within the cache to identify if one or more additional virtual addresses are associated with the physical address for the write access request. In a further embodiment, the method includes, when one or more additional virtual addresses are identified as associated with the physical address, using client identifiers associated with the additional virtual addresses within the translation tables to notify data views of changed data. In a still further embodiment, the method includes updating data at the notified data views with the changed data. In another further embodiment, the method further includes forwarding data associated with the write access request to the target device. Still further, the method can include writing the data associated with the write access request into the memory within the target device.

In another embodiment, the method further includes, when an access request is a read access request, reading data associated with the read access request from the cache at a physical address associated with a virtual address within the read access request and sending the data to the requesting data view. In a further embodiment, the method includes determining if access requests include new virtual addresses not stored within the address translation tables. In a still further embodiment, the method includes, when a new virtual address is included within an access request, adding the new virtual address to the address translation tables along with a client identifier for the requesting data view and a corresponding physical address in the cache, and tagging data within the cache accessed by the access request with the new virtual address.

For one embodiment, a debug management device is disclosed including a memory including a cache associated with debug operations; one or more processors configured to provide a plurality of data views associated with the debug operations and to generate access requests to a memory within a target device, the memory access requests including virtual addresses associated with different virtual address spaces and client identifiers associated with requesting data views; and a memory management unit coupled to the memory and configured to receive the memory access requests, the memory management unit being further configured to translate the virtual addresses to physical addresses within the cache using address translation tables and to access data within the cache using the physical addresses; wherein the address translation tables are configured to associate virtual addresses from the different virtual address spaces with client identifiers and with physical addresses within the cache; and wherein data within the cache is tagged with virtual addresses from prior access requests that accessed the data.

In another embodiment, when an access request is a write access request, the memory management unit is further configured to write data associated with the write access request to the cache at a physical address associated with a virtual address within the write access request. In an additional embodiment, the memory management unit is further configured to use virtual address tags within the cache to identify if one or more additional virtual addresses are associated with the physical address for the write access request. In a further embodiment, when one or more additional virtual addresses are identified as associated with the physical address, the memory management unit is further configured to use client identifiers associated with the additional virtual addresses within the translation tables to notify data views of changed data. In a still further embodiment, the one or more processors are further configured to update data at the notified data views with the changed data. In another further embodiment, the memory management unit is further configured to forward data associated with the write access request to the target device. Still further, the target device can be an integrated circuit system.

In another embodiment, when an access request is a read access request, the memory management unit is further configured to read data associated with the read access request from the cache at a physical address associated with a virtual address within the read access request and sending the data to the requesting data view. In a further embodiment, the memory management unit is further configured to determine if access requests include new virtual addresses not stored within the address translation tables. In a still further embodiment, when a new virtual address is included within an access request, the memory management unit is further configured to add the new virtual address to the address translation tables along with a client identifier for the requesting data view and a corresponding physical address in the cache and is also configured to tag data within the cache accessed by the access request with the new virtual address.

It is further noted that the functional blocks, devices, and/or circuitry described herein can be implemented using hardware, software, or a combination of hardware and software. In addition, one or more processing devices (e.g., central processing units (CPUs), controllers, microcontrollers, microprocessors, hardware accelerators, processors, programmable integrated circuitry, FPGAs (field programmable gate arrays), ASICs (application specific integrated circuits), and/or other processing devices) executing software and/or firmware instructions can be used to implement the disclosed embodiments. It is further understood that one or more of the operations, tasks, functions, or methodologies described herein can be implemented, for example, as software, firmware and/or other program instructions that are embodied in one or more non-transitory tangible computer-readable mediums (e.g., data storage devices, flash memory, random access memory, read only memory, programmable memory devices, reprogrammable storage devices, hard drives, floppy disks, DVDs, CD-ROMs, and/or any other tangible data storage medium) and that are executed by one or more processing devices (e.g., central processing units (CPUs), controllers, microcontrollers, microprocessors, hardware accelerators, processors, programmable integrated circuitry, FPGAs (field programmable gate arrays), ASICs (application specific integrated circuits), and/or other processing devices) to perform the operations, tasks, functions, or methodologies described herein.

Unless stated otherwise, terms such as "first" and "second" are used to arbitrarily distinguish between the elements such terms describe. Thus, these terms are not necessarily intended to indicate temporal or other prioritization of such elements.

Further modifications and alternative embodiments of the described systems and methods will be apparent to those skilled in the art in view of this description. It will be recognized, therefore, that the described systems and methods are not limited by these example arrangements. It is to be understood that the forms of the systems and methods herein shown and described are to be taken as example embodiments. Various changes may be made in the implementations. Thus, although the invention is described herein with reference to specific embodiments, various modifications and changes can be made without departing from the scope of the present invention. Accordingly, the specification and figures are to be regarded in an illustrative rather than a restrictive sense, and such modifications are intended to be included within the scope of the present invention. Further, any benefits, advantages, or solutions to problems that are described herein with regard to specific embodiments are not intended to be construed as a critical, required, or essential feature or element of any or all the claims.

What is claimed is:

1. A method to manage debug operations, comprising
receiving access requests to a memory within a target device for a plurality of data views associated with debug operations, the memory access requests including virtual addresses associated with different virtual address spaces and client identifiers associated with requesting data views;
translating the virtual addresses to physical addresses within a cache using address translation tables, the address translation tables associating virtual addresses from the different virtual address spaces with client identifiers and with physical addresses within the cache; and
accessing data within the cache using the physical addresses;
wherein data within the cache is tagged with virtual addresses from prior access requests.

2. The method of claim 1, further comprising, when an access request is a write access request, writing data associated with the write access request to the cache at a physical address associated with a virtual address within the write access request.

3. The method of claim 2, further comprising using virtual address tags within the cache to identify if one or more additional virtual addresses are associated with the physical address for the write access request.

4. The method of claim 3, further comprising, when one or more additional virtual addresses are identified as associated with the physical address, using client identifiers associated with the additional virtual addresses within the translation tables to notify data views of changed data.

5. The method of claim 4, further comprising updating data at the notified data views with the changed data.

6. The method of claim 2, further comprising forwarding data associated with the write access request to the target device.

7. The method of claim 6, further comprising writing the data associated with the write access request into the memory within the target device.

8. The method of claim 1, further comprising, when an access request is a read access request, reading data associated with the read access request from the cache at a physical address associated with a virtual address within the read access request and sending the data to the requesting data view.

9. The method of claim 1, further comprising determining if access requests include new virtual addresses not stored within the address translation tables.

10. The method of claim 9, further comprising, when a new virtual address is included within an access request, adding the new virtual address to the address translation tables along with a client identifier for the requesting data view and a corresponding physical address in the cache, and tagging data within the cache accessed by the access request with the new virtual address.

11. A debug management device, comprising:
a memory including a cache associated with debug operations;
one or more processors configured to provide a plurality of data views associated with the debug operations and to generate access requests to a memory within a target device, the memory access requests including virtual addresses associated with different virtual address spaces and client identifiers associated with requesting data views; and
a memory management unit coupled to the memory and configured to receive the memory access requests, the memory management unit being further configured to translate the virtual addresses to physical addresses within the cache using address translation tables and to access data within the cache using the physical addresses;
wherein the address translation tables are configured to associate virtual addresses from the different virtual address spaces with client identifiers and with physical addresses within the cache; and
wherein data within the cache is tagged with virtual addresses from prior access requests.

12. The debug management device of claim 11, wherein, when an access request is a write access request, the memory management unit is further configured to write data associated with the write access request to the cache at a physical address associated with a virtual address within the write access request.

13. The debug management device of claim 12, wherein the memory management unit is further configured to use virtual address tags within the cache to identify if one or more additional virtual addresses are associated with the physical address for the write access request.

14. The debug management device of claim 13, wherein, when one or more additional virtual addresses are identified as associated with the physical address, the memory management unit is further configured to use client identifiers associated with the additional virtual addresses within the translation tables to notify data views of changed data.

15. The debug management device of claim 14, wherein the one or more processors are further configured to update data at the notified data views with the changed data.

16. The debug management device of claim 12, wherein the memory management unit is further configured to forward data associated with the write access request to the target device.

17. The debug management device of claim 16, wherein the target device comprises an integrated circuit system.

18. The debug management device of claim 11, wherein, when an access request is a read access request, the memory management unit is further configured to read data associated with the read access request from the cache at a physical address associated with a virtual address within the read access request and sending the data to the requesting data view.

19. The debug management device of claim 11, wherein the memory management unit is further configured to determine if access requests include new virtual addresses not stored within the address translation tables.

20. The debug management device of claim 19, wherein, when a new virtual address is included within an access request, the memory management unit is further configured to add the new virtual address to the address translation tables along with a client identifier for the requesting data view and a corresponding physical address in the cache and is also configured to tag data within the cache accessed by the access request with the new virtual address.

* * * * *